J. W. PETTIJOHN.
UNDERCUT SAW GUIDE.
APPLICATION FILED FEB. 20, 1907.
898,677.
Patented Sept. 15, 1908.
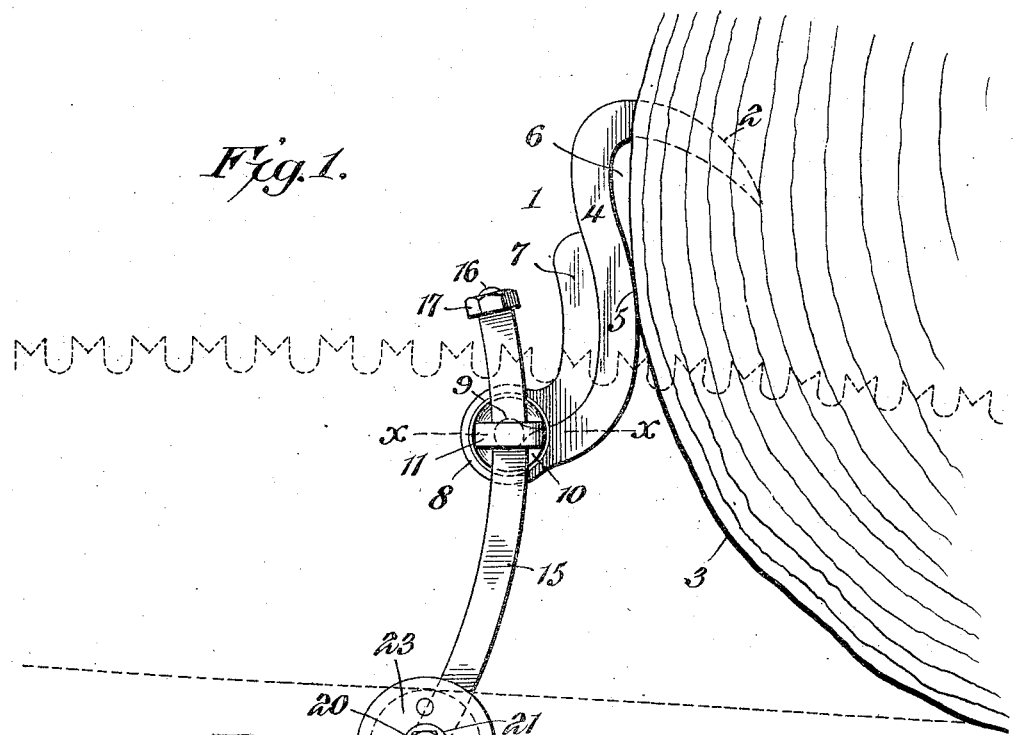
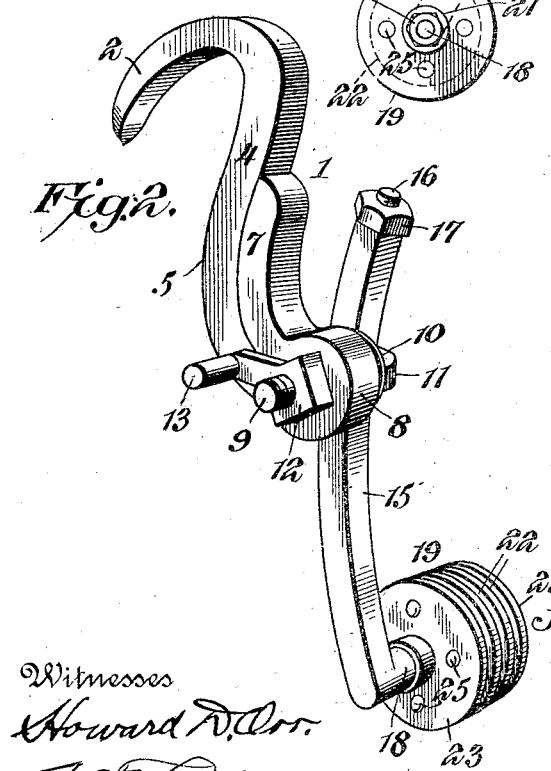
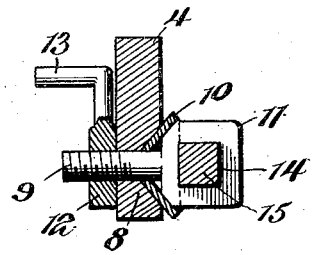
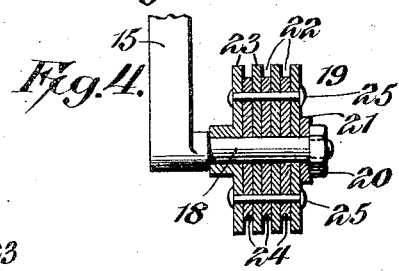
John W. Pettijohn, Inventor,
Witnesses
Howard D. Orr.
J. F. Riley
By
E. G. Siggers
Attorney

UNITED STATES PATENT OFFICE.

JOHN WILSON PETTIJOHN, OF MONTESANO, WASHINGTON.

UNDERCUT-SAW GUIDE.

No. 898,677.　　　　Specification of Letters Patent.　　　Patented Sept. 15, 1908.

Application filed February 20, 1907. Serial No. 358,368.

*To all whom it may concern:*

Be it known that I, JOHN WILSON PETTIJOHN, a citizen of the United States, residing at Montesano, in the county of Chehalis and State of Washington, have invented a new and useful Undercut-Saw Guide, of which the following is a specification.

The invention relates to improvements in undercut saw guides.

The object of the present invention is to improve the construction of undercut saw guides, and to increase the strength and durability of the same and lessen the weight thereof, and to enable undercut saw guides to be constructed more cheaply and easily than heretofore.

A further object of the invention is to provide undercut saw guides, adapted to afford a firm support for a crosscut saw, and capable of being readily driven into and removed from a log without injury to the guide.

Another object of the invention is to provide an undercut saw guide, which may be adjusted more rapidly than heretofore, and which when not in use, may be compactly folded so as to be conveniently carried in the pocket from one place to another.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of an undercut saw guide, constructed in accordance with this invention, and shown applied to a log, the saw being illustrated in dotted lines. Fig. 2 is a perspective view of the saw guide detached. Fig. 3 is a transverse sectional view, taken substantially on the line *x—x* of Fig. 1. Fig. 4 is a detail sectional view, illustrating the construction of the saw supporting wheel and the manner of mounting the same.

Like numerals of reference designate corresponding parts in all the figures of the drawing.

1 designates a dog, provided at the top with a curved bill 2, tapered to a point and adapted to be driven into the side of a log 3, and the bill presents a lower concave face to the log, whereby the dog will be firmly held in engagement with the log by the downward strain resulting from the use of a crosscut saw. The dog 1 is provided with an approximately sigmoidally curved shank 4, presenting a forwardly projecting convex face 5 to the log, whereby the dog is firmly supported in position on the log. The front or inner convex face 5 is located at a point between the ends of the shank or body of the dog, and the upper portion of the shank curves outwardly from the log to provide a loop or opening 6, adjacent to the bill to enable a crow bar, or other tool to be readily introduced between the shank or body of the dog and the log for prying the bill out of the same. This will enable the dog to be easily and quickly removed from a log without injury to the former.

The lower portion of the shank or body of the dog is curved outwardly or rearwardly from the log, and the metal is bent backward on the shank or body and is extended to form a reinforcing or bracing portion 7. The doubling or bending of the metal to provide the reinforcing or bracing portion 7, forms an eye 8 for the reception of a bolt 9. The eye 8 is counter-sunk at one side to form a seat for a cup-shaped or conical clamping member or washer 10, which receives the inner portion of the head 11 of the bolt 9. The threaded portion of the bolt receives a nut 12, which is provided with a suitable crank arm or handle 13, but any other suitable means may be employed for turning the nut.

The head 11 of the bolt is provided with a rectangular opening 14, through which an adjustable hanger bar 15 passes. The hanger bar is rectangular in cross section to conform to the configuration of the square opening of the head of the bolt, and it is curved or bowed longitudinally to frictionally engage the walls of the bolt opening, whereby when the nut is loosened, the hanger bar will be prevented from dropping in the opening 14. The upper end 16 of the hanger bar is reduced and threaded to receive a nut 17, which forms a stop for limiting the downward movement of the hanger bar to prevent the same from accidentally leaving the opening of the bolt, and the latter constitutes a pivot for the hanger bar to permit the latter to be folded alongside the dog to shorten the device for enabling the same to be conveniently carried in the pocket. The hanger bar is secured in its adjustment by means of the cup-shaped or conical washer, which projects beyond the inner edge of the head of the bolt, and engages the hanger bar above and below the same. The inner corners of the head of the bolt are beveled to provide an inner tapering portion to fit within the conical or cup-shaped washer, but the head of the bolt may be of any other preferred configuration. When the nut 12 is tightened, the conical or cup-shaped washer is forced into engagement with the adjacent side or face of the curved hanger bar, and this together with the frictional engagement of the hanger bar and the eye of the bolt, firmly holds the hanger bar in its adjusted position.

The lower end of the hanger bar is provided with a transverse shaft or spindle 18, formed integral with the hanger bar and receiving a saw supporting wheel 19, secured on the shaft or spindle by a nut 20. The nut 20 engages the outer end of the shaft or spindle, which is threaded, and the washer 21 is preferably interposed between the nut and the saw supporting and guiding wheel 19. Any other suitable means, however, may be employed for retaining the wheel on the shaft or spindle of the hanger bar. The saw supporting wheel, which is provided with a plurality of saw-receiving grooves 22, is preferably composed of disks 23 and 24, secured together by transverse rivets 25, or other suitable fastening devices. The disks 23, which are of greater diameter than the other disks 24, project beyond the peripheries of the latter and form the side walls of the grooves 22. The disks, which are provided with registering central openings to receive the transverse shaft or spindle 18, also have an annular series of alined eccentrically arranged openings spaced from the central openings and receiving fastening devices 25, which are arranged outside of the shaft or spindle 18. The inner side disk is provided with an integral projecting hub extension, which spaces the saw supporting wheel from the hanger bar.

It will be seen that as the shank or body of the dog is bent back upon itself to provide the reinforcing portion and to form the eye, it may be easily and cheaply manufactured, and at the same time possesses great strength. Also it will be clear that, as the curved hanger bar frictionally engages the walls of the bolt opening, and is thereby prevented from dropping through the same, when the nut of the bolt is loosened, the device may be more easily and quickly adjusted than one having a straight bar or slot.

Having thus fully described my invention, what I claim as new and desire to secure by Letters Patent, is:—

1. An undercut saw guide provided with a dog having a bill at the top and provided below the bill with an intermediate forwardly bowed body portion arranged to fit against a log to steady the device, said bill and forwardly bowed portion forming a loop or opening adjacent to the bill for the purpose set forth.

2. An undercut saw guide provided with a dog consisting of a bill, and a substantially sigmoidally curved body extending downwardly from the bill and forming an intermediate forwardly projecting log-engaging portion, providing an upper loop or opening located adjacent to the bill to permit the introduction of a tool for withdrawing the bill from a log.

3. An undercut saw guide comprising a dog consisting of a body provided at one end with a bill, and having its other end bent upon itself to form an eye and extending beyond the eye to provide a reinforcing portion, a saw supporting hanger, and fastening means passing through the eye of the dog for securing the hanger to the latter.

4. An undercut saw guide comprising a dog provided with an enlarged eye having a tapered opening at one side forming a conical seat, a fastening bolt extending through the opening of the dog and provided with an integral eye, a hanger bar passing through the eye of the bolt and provided at its lower portion with saw supporting means, a conical clamping washer fitted partially within the said seat and bearing against the inner edge of the eye of the bolt and also against the inner side face of the hanger bar, and a nut mounted on the fastening bolt for adjusting the parts to clamp the hanger bar.

5. An undercut saw guide comprising a dog having one end doubled back on itself and forming an enlarged eye, the latter being tapered to provide a conical seat, a fastening bolt extending through the eye of the dog and having an integral eye beveled at the inner side, a curved hanger bar passing through the eye of the bolt and provided at its inner side with a flat face, a conical clamping washer fitted partially within the said seat and bearing against the flat face of the hanger bar, a nut mounted on the bolt for adjusting the parts to clamp the hanger bar, and saw supporting means carried by the hanger bar.

In testimony, that I claim the foregoing as my own, I have hereto affixed my signature in the presence of two witnesses.

JOHN WILSON PETTIJOHN.

Witnesses:
ERNEST MARION FRENCH,
JACOB L. PHILLIPS.